United States Patent
Sato et al.

(10) Patent No.: US 7,151,784 B2
(45) Date of Patent: Dec. 19, 2006

(54) DEMULTIPLEXER CIRCUIT

(75) Inventors: Tomoya Sato, Osaka (JP); Kazuhisa Tanaka, Hirakata (JP); Norihiko Mizobata, Habikino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1093 days.

(21) Appl. No.: 10/196,719

(22) Filed: Jul. 17, 2002

(65) Prior Publication Data

US 2003/0016704 A1 Jan. 23, 2003

(30) Foreign Application Priority Data

Jul. 18, 2001 (JP) .............................. 2001-217500

(51) Int. Cl.
*H04J 3/02* (2006.01)

(52) U.S. Cl. ..................................... 370/537
(58) Field of Classification Search ...................... None
See application file for complete search history.

(56) References Cited

U.S. PATENT DOCUMENTS

| 5,619,197 | A | 4/1997 | Nakamura | ................... 341/50 |
|---|---|---|---|---|
| 5,708,961 | A * | 1/1998 | Hylton et al. | .................. 725/81 |
| 5,835,591 | A | 11/1998 | Cochon et al. | ................ 380/10 |
| 6,621,870 | B1 * | 9/2003 | Gordon et al. | ......... 375/240.28 |
| 6,970,482 | B1 * | 11/2005 | Kim | ............................ 370/542 |
| 6,996,101 | B1 * | 2/2006 | Coupe et al. | ................ 370/389 |

FOREIGN PATENT DOCUMENTS

| JP | 2000-083064 | 3/2000 |
|---|---|---|
| JP | 2000-156705 | 6/2000 |

* cited by examiner

*Primary Examiner*—Frank Duong
(74) *Attorney, Agent, or Firm*—Steptoe & Johnson LLP (57) ABSTRACT

A demultiplexer circuit which can simultaneously demultiplex plural pieces of input data while minimizing the circuit scale. The demultiplexer circuit includes an input line identification information addition circuit 2 for giving input line identification information to input data which have data identification information and are inputted through plural input lines 1, respectively; a multiplexer 4 for outputting the input data which have been given the input line identification information, respectively, by the input line identification information addition circuit 2 through one common line 5; a filter 6 for filtering the data outputted from the multiplexer 4 on the basis of the input line identification information and the data identification information at one time; and a filter table 7 that contains filtering conditions which are used in the filter 6.

9 Claims, 9 Drawing Sheets

TSID filter table

| |
|---|
| 00 |
| 00 |
| 00 |
| 01 |
| ⋮ |
| 10 |
| 11 |
| 11 |

PID filter table

| |
|---|
| 0000001000010 |
| 0100011000010 |
| 0110001000100 |
| 1000000000101 |
| ⋮ |
| 0100010000000 |
| 1100010001110 |
| 0100010001111 |

TSID/PID filter table

| TSID part | PID part |
|---|---|
| 00 | 0000001000010 |
| 00 | 0100011000010 |
| 00 | 0110001000100 |
| 01 | 1000000000101 |
| ⋮ | ⋮ |
| 10 | 0100010000000 |
| 11 | 1100010001110 |
| 11 | 0100010001111 |

Fig.5(a)

TSID filter table

| 01 |
|---|
| 11 |

Fig.5(b)

PID filter table

| 0000001000010 |
|---|
| 0100011000010 |
| 0110001000100 |
| 1000000000101 |
| |
| 0100010000000 |
| 1100010001110 |
| 0100010001111 |

| pre-conversion TSID | post-conversion TSID |
|---|---|
| 00 | 00 |
| 01 | 01 |
| 10 | 00 |
| 11 | 11 | conversion target TSID

DEMULTIPLEXER CIRCUIT

FIELD OF THE INVENTION

The present invention relates to a demultiplexer circuit in a LSI (Larger Scale Integrated Circuit) and, more particularly, to a demultiplexer circuit for demultiplexing data which are inputted through plural input lines.

BACKGROUND OF THE INVENTION

With the spread of digital television broadcasting, most receivers (so-called televisions) have turned to be provided with a digital processing circuit. In addition, recording devices (so-called video cassette recorders) and video games have conventionally been connected through analog lines, while digital lines are employed increasingly to connect these devices with televisions. Further, as so-called digital household electrical appliances such as DVD players, digital video cameras, and mobile phones are coming along, the kinds of devices to be connected with the television are greatly increased.

Figure 9:
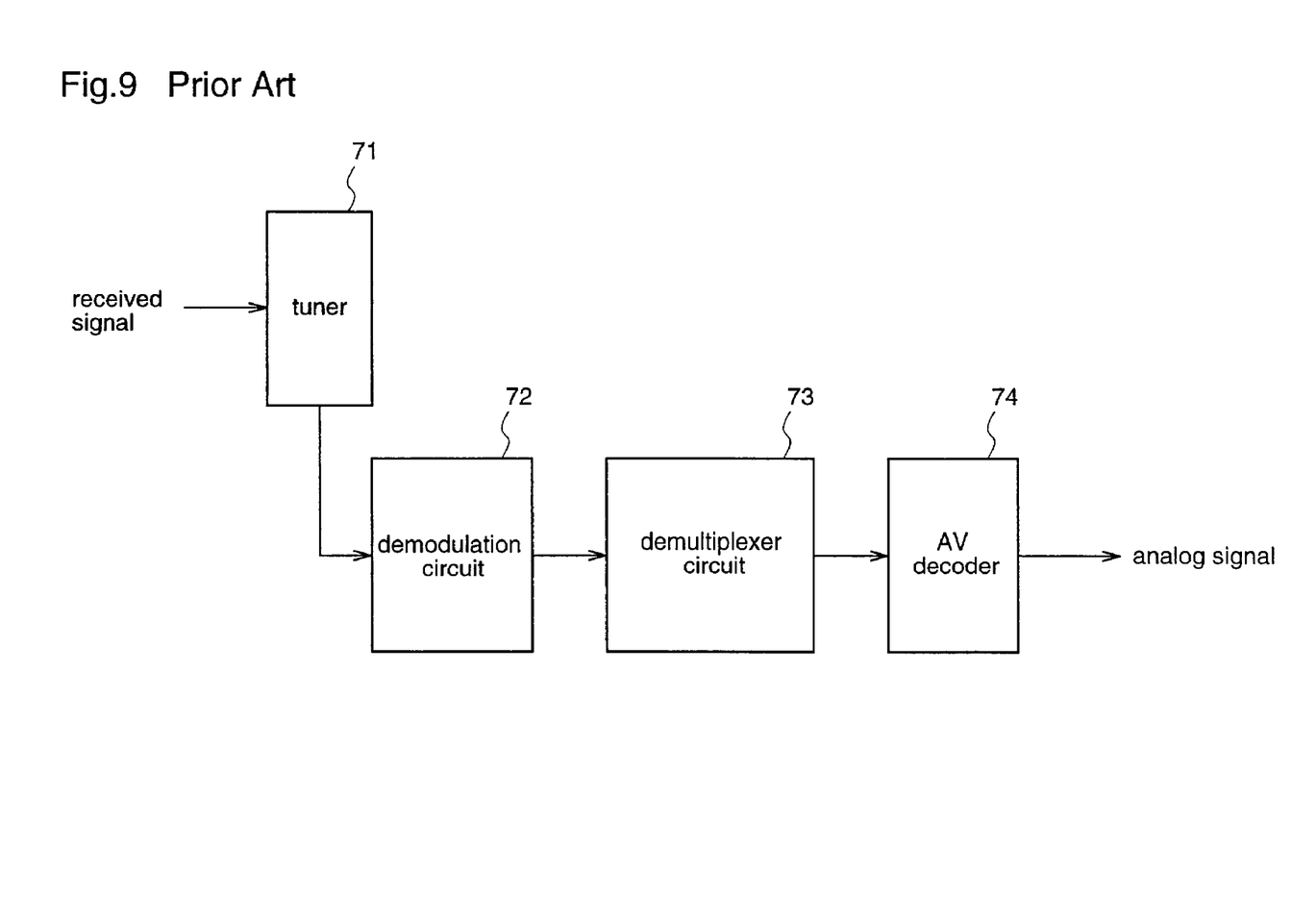
FIG. 9 is a block diagram illustrating a prior art demultiplexer circuit.

For example, in a television that receives conventional common digital television broadcasts, as schematically shown in FIG. 9, receipt of a program desired by a user can be performed through one processing line, i.e., selecting one of plural multiplexed signals which are transmitted from respective broadcasting stations and received via an antenna (not shown), by means of a tuner 71, demodulating the selected signal in a demodulation circuit 72, demultiplexing the signal obtained in this demodulation in a demultiplexer circuit 73, selecting one program from the signal obtained by the demodulation, and then converting the selected program into analog images in an AV decoder 74 to be displayed on the television screen.

However, when a large number of the digital household electrical appliances are connected to the television, plural data processings: outputting one of received broadcast programs to a video cassette recorder or the like to be recorded therein while playing back video signals which are inputted from a DVD player, are required in the conventional television as shown in FIG. 9. In this case, the demultiplexer circuit 73 is required to process two kinds of data. Further, when an apparatus which can carry out an input processing and an output processing simultaneously, like a hard disk recording device is connected, the demultiplexer circuit is required to simultaneously process three or more kinds of data.

Therefore, the need for a demultiplexer circuit which can demultiplex plural multiplexed input signals has arisen.

An example of the conventional demultiplexer circuit is described in Japanese Published Patent Application No. 2000-156705. This demultiplexer circuit includes only a demultiplexing function corresponding to one kind of data. On the other hand, an example of a demultiplexer circuit that processes plural kinds of data is described in Japanese Published Patent Application No. 2000-86064. This demultiplexer circuit has plural demultiplexers in parallel, by a number corresponding to the number of kinds of inputted data, to carry out plural data processings. Therefore, this conventional demultiplexer circuit is required to have three demultiplexers when it is required to process three kinds of input data, and four demultiplexers when it is required to process four kinds of input data.

In this demultiplexer circuit which includes plural demultiplexers each demultiplexing one multiplexed data input, by a number corresponding to the number of the input data, the demultiplexing process is easily carried out because the respective demultiplexers are independent from each other, while the circuit scale is unfavorably increased because plural circuits having the same structures are included. Further, it is required that memories which stores conditions for the demultiplexing process should be included respectively in each of the circuits, whereby the circuit scale is increased, and the efficiency in use is adversely decreased.

In recent years, such a demultiplexer circuit is integrated on one LSI together with other circuits, while the increase in the circuit scale of the demultiplexer circuit results in an increase in the costs of the LSI containing the multiplexer circuit. Further, such a demultiplexer circuit is undesirable also from the viewpoint of power saving. Therefore, a demultiplexer circuit that has a minimum circuit scale, and can simultaneously process various kinds of multiplexed data is demanded.

SUMMARY OF THE INVENTION

The present invention has for its object to provide a demultiplexer circuit that can simultaneously demultiplex data which are inputted through plural input lines, by one circuit.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided a demultiplexer circuit comprising: an input line identification information addition circuit for adding input line identification information to input data which previously have data identification information and are inputted from plural input lines, respectively, to identify the plural input lines; a multiplexer for multiplexing the respective input data to which the input line identification information has been added, and outputting multiplexed data through one common line; a filter table that contains input line identification information and data identification information which are used as filtering conditions; and a filter for filtering the input line identification information and the data identification information in the multiplexed data which is outputted from the multiplexer on the basis of the filtering conditions contained in the filter table, to extract desired data. Therefore, data which are inputted from plural input lines can be demultiplexed simultaneously and efficiently by one circuit. Further, since one circuit carries out the processing, the logic circuit scale can be minimized to reduce the entire circuit area of a LSI, and the LSI costs can be reduced.

According to a 2nd aspect of the present invention, in the demultiplexer circuit of the 1st aspect, the input line identification information addition circuit replaces an arbitrary area in each of the input data previously having the data identification information, which area does not affect a demultiplexing process, with the input line identification information. Therefore, data which are inputted through plural input lines can be demultiplexed simultaneously in one circuit.

According to a 3rd aspect of the present invention, in the demultiplexer circuit of the 1st aspect, the filter table contains the input line identification information and the data identification information in one table, and the filter filters the input data which is outputted from the multiplexer on the basis of the input line identification information and the data identification information, simultaneously in one processing. Therefore, the multiplexer circuit requires only one filter table that is referred to, whereby the number of memories can be greatly reduced and the memory capacity can be effectively used.

According to a 4th aspect of the present invention, in the demultiplexer circuit of the 1st aspect, the filter table contains the input line identification information and the data identification information separately in different tables, and the filter filters the input data which is outputted from the multiplexer on the basis of the input line identification information and the data identification information, individually. Therefore, data which are inputted through plural input lines can be demultiplexed simultaneously and efficiently in one circuit. Further, since one circuit carries out the processing, the logic circuit scale can be minimized to reduce the entire circuit area of a LSI, and the LSI costs can be reduced. In addition, the filtering can be performed on the basis of only one of the input line identification information and the data identification information, depending on the input data, whereby an efficient filtering can be carried out.

According to a 5th aspect of the present invention, in the demultiplexer circuit of the 3rd aspect, the filter table contains another filtering conditions in addition to the input line identification information and the data identification information in one table, and the filter performs filtering on the basis of the filtering conditions contained in the filter table. Therefore, a function of filtering inputted data on the basis of information in the filter table containing another filtering conditions, such as scramble control information of TS packets, in addition to the input line identification information and the data identification information can be implemented.

According to a 6th aspect of the present invention, in the demultiplexer circuit of the 4th aspect, the filter table contains other filtering condition in addition to the input line identification information and the data identification information, separately, and the filter performs filtering on the basis of the filtering conditions contained in the filter table, individually. Therefore, a function of filtering inputted data on the basis of information in the filter table containing other filtering condition, such as scramble control information of TS packets, in addition to the input line identification information and the data identification information can be implemented.

According to a 7th aspect of the present invention, the demultiplexer circuit of the 1st aspect, includes: an input line identification information check circuit for restoring the area in the data outputted from the filter, which has been replaced with the input line identification information by the input line identification information addition circuit, into its original bit state. Therefore, adverse influences upon a circuit of the next stage, resulting from the added input line identification information, can be completely eliminated.

According to an 8th aspect of the present invention, the demultiplexer circuit of the 1st aspect includes: an input line identification information conversion table for converting the input line identification information that is added by the input line identification information addition circuit depending on input lines to which data have been inputted, into desired input line identification information. Therefore, the input lines can be changed according to the load conditions of the TS packets, whereby TS packets can be distributed optimally. Further, by converting the TSID, plural pieces of the same kinds of input data can be inputted through different input lines.

According to a 9th aspect of the present invention, in the demultiplexer circuit of the 1st aspect, plural tuners for extracting data from broadcast radio waves based on different standards, respectively, are included in a previous stage of the input line identification information addition circuit, and the data which are extracted from the broadcast radio waves by the plural tuners are processed. Therefore, data obtained from broadcast radio waves based on different standards, such as BS broadcasting, CS broadcasting and cable broadcasting, can be demultiplexed simultaneously and efficiently in one circuit.

DETAILED DESCRIPTION OF THE PREFERRED EMBODIMENTS

[Embodiment 1]

Figure 1:
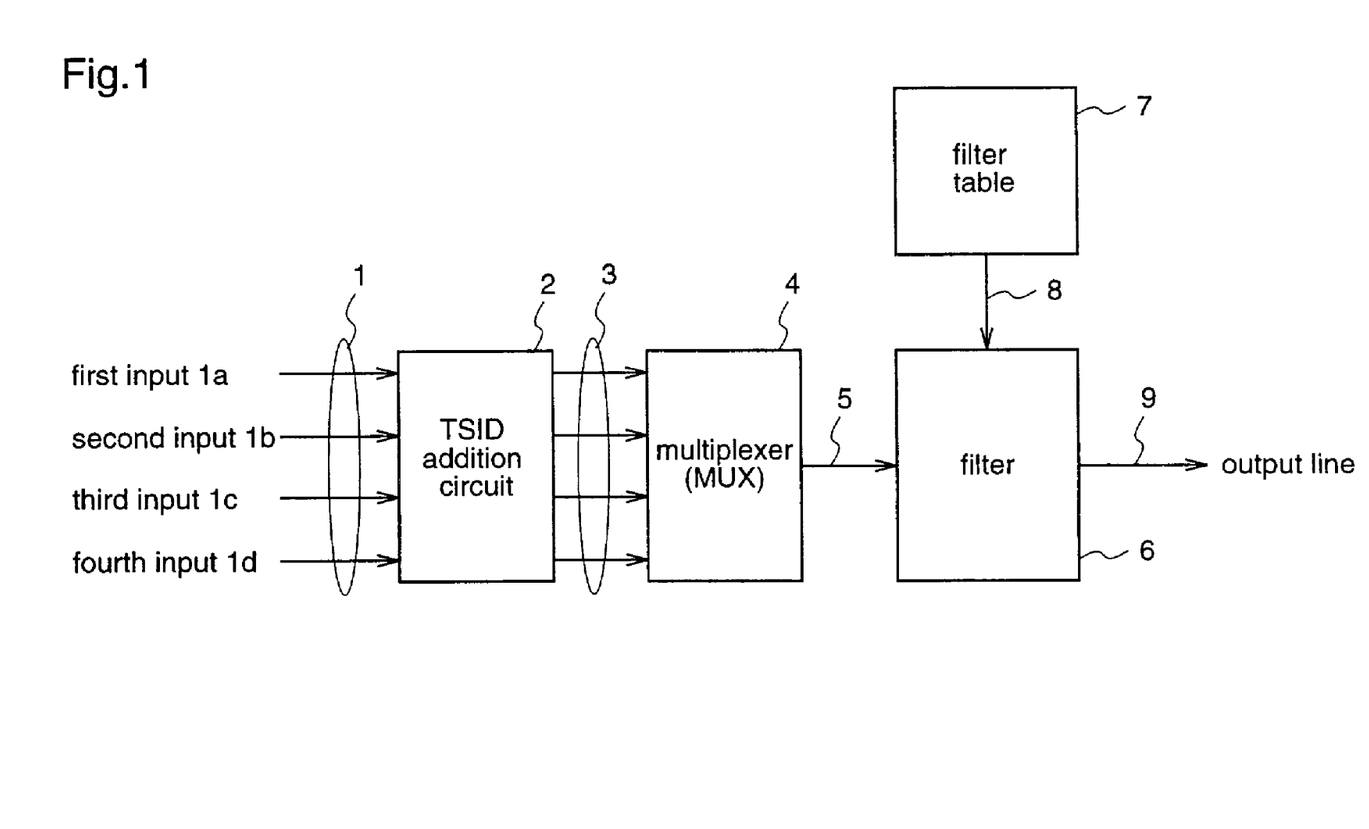
FIG. 1 is a block diagram illustrating a structure of a demultiplexer circuit according to a first embodiment of the present invention.

FIG. 1 is a diagram illustrating a structure of a demultiplexer circuit according to a first embodiment of the present invention. In FIG. 1, the demultiplexer circuit of the first embodiment comprises an input line identification information addition circuit 2, a multiplexer 4, a filter 6, and a filter table 7.

The input line identification information addition circuit 2 replaces an arbitrary area which does not affect a demultiplexing process, in plural pieces of multiplexed data which are inputted from outside through plural input lines 1, respectively, with input line identification information, and outputs the data to the multiplexer 4 through output lines 3. Here, each of the data inputted through the plural input lines 1 is in the format of packets. Each of the packets previously contains data identification information (hereinafter, referred to as PID as required) which is information for identifying data. In this first embodiment, four inputs, i.e., a first input 1a to a fourth input 1d are provided as the plural input lines. The multiplexer 4 multiplexes the plural input data having the input line identification information attached thereto, and outputs the multiplexed data to an output line 5. The filter 6 filters the multiplexed signal that is obtained through the output line 5, with referring to data in the filter table 7 that is obtained through a connection line 8, and outputs filtered input data to an output line 9. The filter table 7 is a storage element, such as a memory, which contains combinations of input line identification information and data identification information as to the respective data which are passed through the filter 6, as one table data. The data in the table are updated as required. The filter 6 compares a combination of input line identification information and data identification information which is included in the data inputted through the output line 5, with the combinations of input line identification information and data identification information stored in the filter table 7. When the both information match with each other, the filter 6 outputs the matched input data through the output line 9 as data resulting from the filtering.

The operation of the demultiplexer circuit which is constructed as described above will be described. It is assumed here that the data inputted through the input lines 1 are MPEG2 transport stream packets (hereinafter, referred to as TS packets) which are used for digital televisions or the like, but the present invention may apply to input data which are in the format of packets including the data identification information.

Figures 2A, 2B:
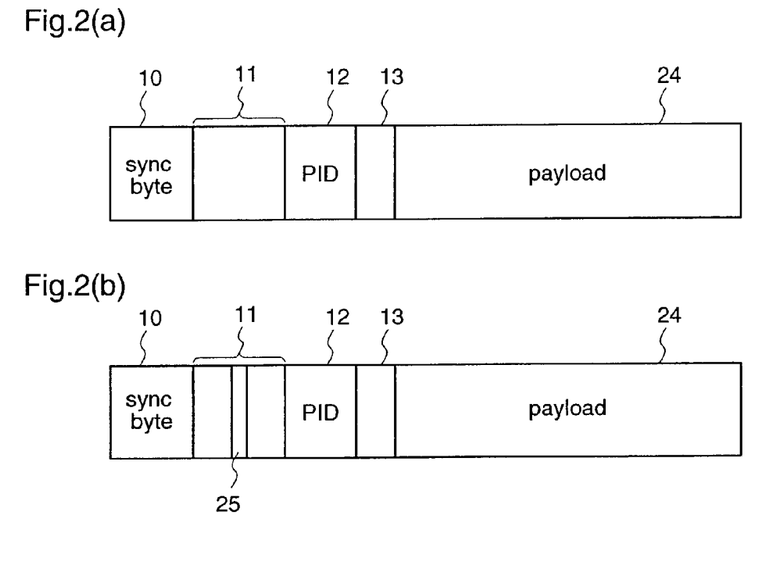
FIGS. 2(a) and 2(b) are diagrams schematically illustrating data in the format of a transport stream, which are inputted to the demultiplexer circuit according to the first embodiment.

FIG. 2(*a*) is a diagram for explaining a data format of a TS packet which is inputted to the demultiplexer circuit according to the first embodiment. FIG. 2(*b*) is a diagram for explaining a TS packet having input line identification information (hereinafter, referred to as TSID as required) 25 attached thereto. In these figures, the TS packet has a sync byte 10, a PID 12 as data identification information that is previously included in the TS packet, a payload 24 that contains data, and a scramble control information 13. This TS packet includes an arbitrary data area that is not usually used in a demultiplexing process and does not directly affect the demultiplexing process even when it is replaced with another data, at any position in the TS packet. Here, such an area 11 that does not affect the demultiplexing process is located between the sync byte 10 and the PID 12. Then, a part of the area 11 that does not affect the demultiplexing process is replaced with the input line identification information 25, as shown in FIG. 2(*b*).

Figure 3A:
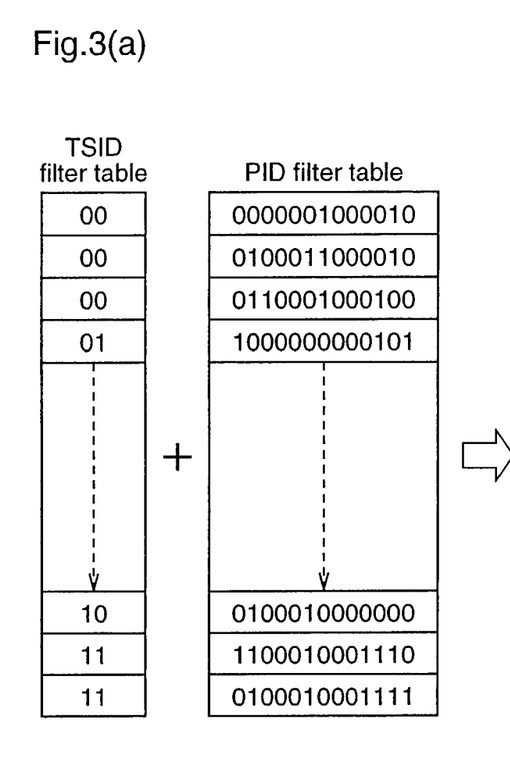
FIGS. 3(a) and 3(b) are diagrams for explaining a filter table in the demultiplexer circuit according to the first embodiment.
Figure 3B:
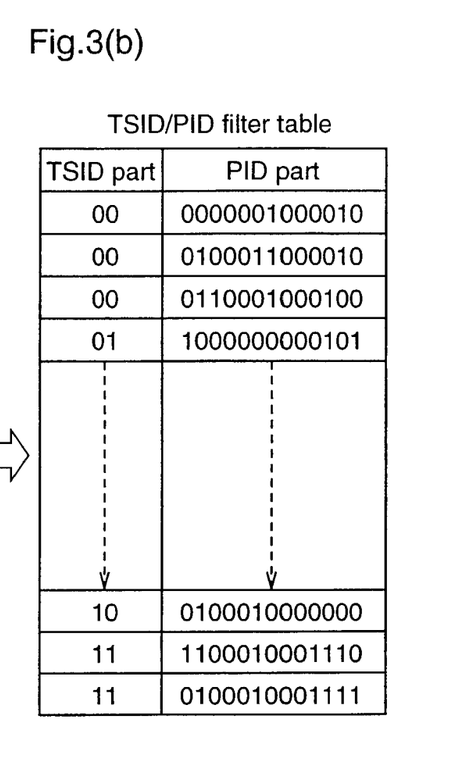

FIGS. 3(*a*) and 3(*b*) are diagrams schematically showing information stored in the filter table 7 of the demultiplexer circuit according to the first embodiment. A TSID/PID filter table shown in FIG. 3(*b*), which is obtained by combining a TSID filter table and a PID filter table, is contained in the filter table 7. TSID and PID in each row of the TSID/PID filter table are a combination of TSID and PID as conditions for designating data which are to be passed through the filter 6.

Initially, four TS packets which are inputted to the first to fourth inputs 1a to 1d of the input lines 1 as shown in FIG. 1 are inputted to the TSID addition circuit 2. The TSID addition circuit 2 replaces a part of the arbitrary area 11 in each packet (two bits in this case), which does not affect the demultiplexing process for TS packets, as shown in FIG. 2(*b*), with the input identification information 25, and outputs the packets through the output lines 3. More specifically, in order to identify four TS packets which are inputted to the first to fourth inputs 1a to 1d of the input lines 1, the TSID addition circuit 2 replaces, for example, "00" in the first TS packet inputted through the first input 1a, "01" in the second TS packet inputted through the second input 1b, "10" in the third TS packet inputted through the third input 1c, and "11" in the fourth TS packet inputted through the fourth input 1d, with the TSID, respectively.

Next, the multiplexer 4 multiplexes the respective TS packets to which the TSID has been added by the TSID addition circuit 2, and outputs a multiplexed packet through the output line 5.

When the TS packet including the TSID is inputted through the output line 5, the filter 6 performs filtering on the basis of the TSID and the PID simultaneously and collectively for the inputted TS packet. More specifically, data in respective rows of the TSID/PID filter table in the filter table 7 as shown in FIG. 3 are read to decide whether or not TSID and PID in the inputted TS packet match with TSID and PID values in any row of the TSID/PID filter table, stored in the filter table 7. When there are any TSID and PID values match with the TSID and PID in the inputted TS packet, the TS packet having these TSID and PID is outputted through the output line 9 as an output to a circuit of the next stage. When the TSID and the PID of the inputted TS packet do not match with TSID and PID values in any row of the TSID/PID filter table, i.e., do not meet the filtering conditions stored in the filter table 7, this TS packet which does not meet the filtering conditions is temporarily stored in a buffer memory (not shown) or the like, and stored TS packets will be collectively deleted later. Thereby, only TS packet having predetermined PID, which is selected from the TS packets inputted through the predetermined input lines, is separated and extracted by the filter.

Further, by adding new filtering conditions to the filter table 7, a function of performing filtering on the basis of other filtering conditions, simultaneously with the TSID/PID, can be implemented. As the new filtering conditions, there are scramble control information 13 included in the TS packet, and the like.

According to the first embodiment, the TSID addition circuit 2 replaces an arbitrary area 11 which does not affect the demultiplexing process for the TS packets which are inputted through the plural input lines 1, with the input line identification information (TSID) 25, and then the filter 6 performs filtering by using this TSID value as conditions. Therefore, the demultiplexing process for the plural input TS packets can be carried out by one circuit, whereby the circuit scale of the logic circuit can be minimized. Accordingly, when this demultiplexer circuit is incorporated in a LSI, the entire circuit scale of the LSI can be miniaturized, thereby reducing the costs of the LSI.

Further, the TS packet can be filtered by the filter 6 and the filter table 7 on the basis of the TSID and the PID simultaneously and at one time, whereby the number of filters and the number of filter tables can be set at one, respectively, and the area of the circuit and the number of memories can be reduced.

In this first embodiment, the descriptions have been given of a case where there are four input lines. However, according to the present invention, by replacing an area comprising n bits (n is a natural number) in the area 11 that does not affect the demultiplexing process for the inputted TS packets, with TSID comprising n bits, $2^n$ inputs at maximum can be inputted to the TSID addition circuit 2, and up to $2^n$ inputs can be processed.

Further, in this first embodiment, the inputted data are in the format of packets. However, since the filtering on the basis of only the TSID and PID is carried out in the filtering process, the demultiplexer circuit of the present invention can also process input data which are not in the format of packets as long as the data inputted to the TSID addition circuit 2 has an arbitrary area that does not affect the demultiplexing process and requires the filtering process.

[Embodiment 2]

According to a demultiplexer circuit according to a second embodiment of the present invention, in place of filtering inputted data on the basis of the input line identification information and the data identification information simultaneously in one processing, the filter table contains the input line identification information and the data identification information separately in different tables, and the filter filters inputted data which are outputted from the multiplexer individually on the basis of input line identification information and data identification information.

Figure 4:
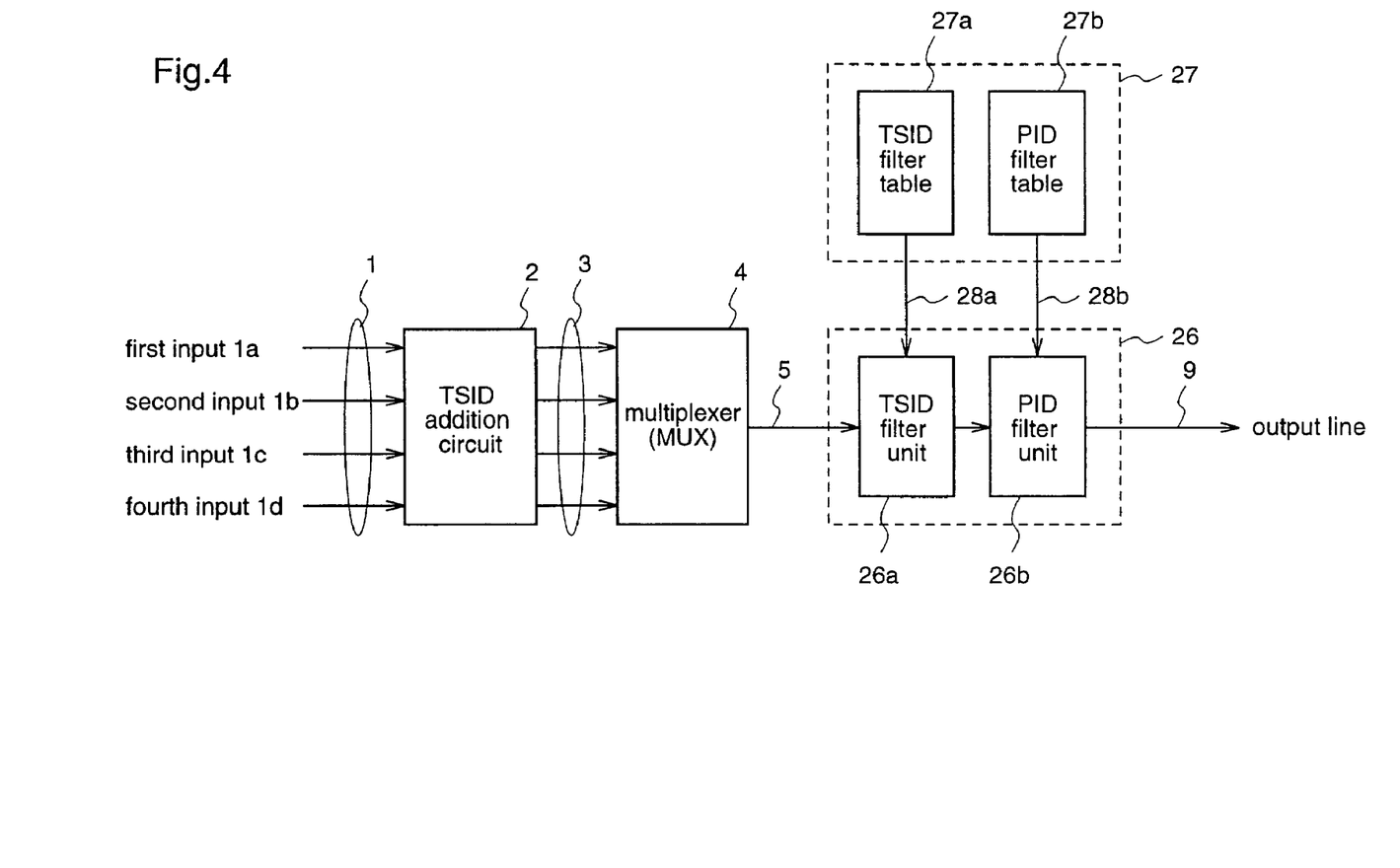
FIG. 4 is a block diagram illustrating a structure of a demultiplexer circuit according to a second embodiment of the present invention.

FIG. 4 is a block diagram illustrating a structure of the demultiplexer circuit according to the second embodiment. This demultiplexer circuit is provided with a filter 26 comprising a TSID filter unit 26a and a PID filter unit 26b in-place of the filter 6 in the demultiplexer circuit of the first embodiment, and a filter table 27 comprising a TSID filter table 27a and a PID filter table 27b which provide table data as filtering conditions to the TSID filter unit 26a and the PID filter unit 26b through connection lines 28a and 28b, respectively, in place of the filter table 7.

In this figure, the same reference numerals as those in FIG. 1 denote the same or corresponding elements. The TSID filter unit 26a compares TSID of a TS packet that is multiplexed by the multiplexer 4 and inputted through the output line 5, with table data which are filtering conditions obtained from the TSID filter table 27a through the connection line 28a. When any value in the table data matches the TSID, this TS packet is outputted to the PID filter unit 26b. The PID filter unit 26b compares PID of the TS packet that is outputted from the TSID filter unit 26a, with table data which are filtering conditions obtained from the PID filter table 27b through the connection line 28b. When any value in the table data matches the PID, this TS packet is outputted through the output line 9 as a filtering result of the filter 26.

Figure 5A:
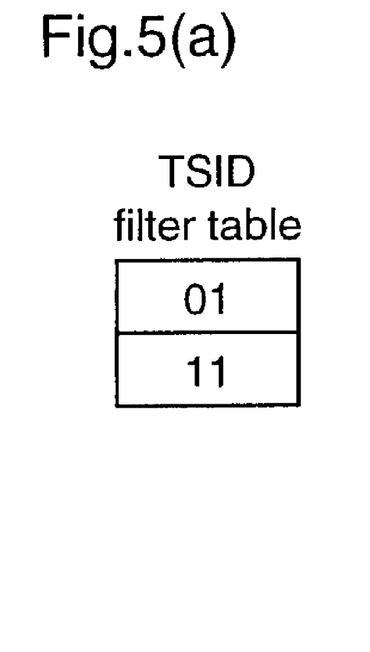
FIGS. 5(a) and 5(b) are diagrams for explaining a filter table in the demultiplexer circuit according to the second embodiment.
Figure 5B:
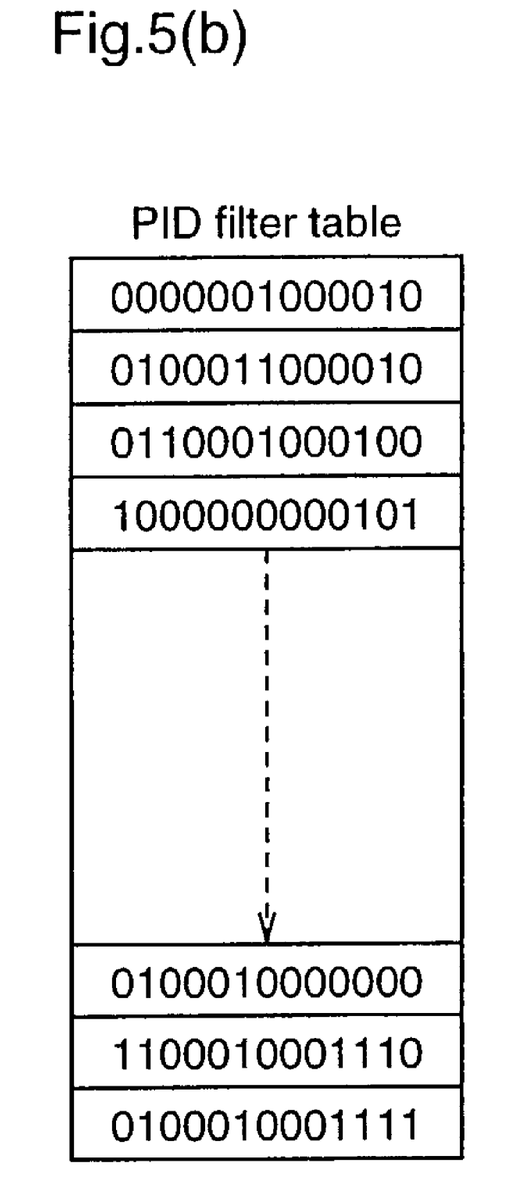

FIG. 5(a) shows an example of the table data in the TSID filter table 27a according to the second embodiment, and FIG. 5(b) shows an example of the table data in the PID filter table 27b. TSIDs as conditions for designating data which are to be passed through the TSID filter unit 26a are stored in the TSID filter table 27a, and TS packets having the same values as these TSID values stored in the TSID filter table 27a can pass through the TSID filter unit 26a. PIDs as conditions for designating data which are to be passed through the PID filter unit 26b are stored in the PID filter table 27b, and TS packets having the same values as these PID values stored in the PID filter table 27b can pass through the PID filter unit 26b.

Next, the operation of the demultiplexer circuit according to the second embodiment will be described. Here, descriptions of the same elements as those in the first embodiment are omitted here.

When a TS packet that has been multiplexed by the multiplexer 4 is inputted to the filter 26 through the output line 5, TSID filter unit 26a compares, TSID of this TS packet with the table data as the filtering conditions which are obtained from the TSID filter table 27a through the connection line 28a. Then, when a TSID that matches the TSID of the inputted TS packet is included in the TSID filter table 27a, this TS packet is outputted to the PID filter unit 26b. On the other hand, when there is no TSID that matches the TSID of the inputted TS packet, the TS packet which does not meet the filtering conditions is temporarily stored in a buffer memory (not shown) or the like, and then stored TS packets will be collectively deleted later. The PID filter unit 26b compares PID of the TS packet which has been passed through the TSID filter unit 26b, with the table data as the filtering conditions obtained from the filter table 27b through the connection line 28b. When a PID that matches the PID of the TS packet is included in the PID filter table 27b, this TS packet is outputted through the output line 9 as a filtering result of the filter 26. On the other hand, when there is no PID that matches the PID of the TS packet, the TS packet which does not meet the filtering conditions is temporarily stored in a buffer memory (not shown) or the like, and then stored packets will be collectively deleted later.

In this second embodiment, the TS packet is filtered by the TSID filter unit 26a, and thereafter filtered by the PID filter unit 26b. However, according to the present invention, it is possible that the TS packet is filtered by the PID filter unit 26b, and thereafter filtered by the TSID filter unit 26a. Also in this case, the same effects as described above in the second embodiment can be obtained.

Further, by adding new filtering conditions to the filter table 27, the filtering can be implemented on the basis of other filtering conditions, simultaneously with the TSID/PID. As the new filtering conditions, there are scramble control information 13 included in the TS packet, and the like.

The demultiplexer circuit according to the second embodiment produces the same effects as those obtained by the demultiplexer circuit of the first embodiment.

Further, according to the present invention, the filtering can be performed on the basis of only one of the input line identification information and the data identification information, depending on the input data, whereby the filtering can be carried out efficiently.

[Embodiment 3]

A demultiplexer circuit according to a third embodiment of the present invention converts input line identification information that is added to input data, to distribute TS packets optimally, as well as restores the input data to which the input line identification information has been added to its original bit state, to prevent adverse influences upon an internal circuit of the next stage.

Figure 6:
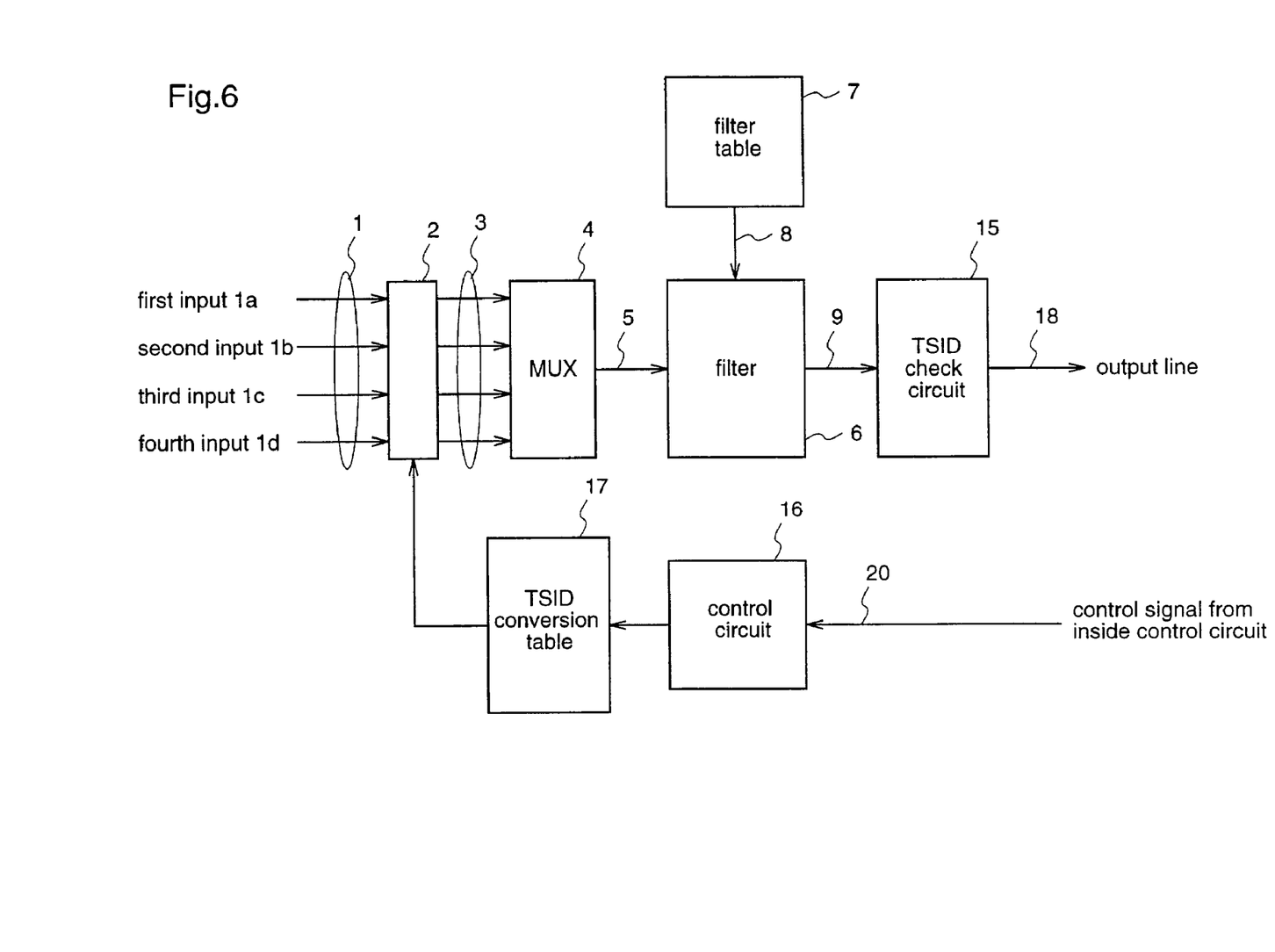
FIG. 6 is a block diagram illustrating a structure of a demultiplexer circuit according to a third embodiment of the present invention.

FIG. 6 is a block diagram illustrating a structure of the demultiplexer circuit according to the third embodiment. In this figure, the same reference numerals as those in FIG. 1 denote the same or corresponding elements.

An input line identification information (TSID) check circuit 15 checks TSID of a TS packet that is outputted from the filter 6, restores an area which has been replaced with the TSID to its original state where the area has not yet been replaced with the TSID, and outputs the restored TS packet through an output line 18.

Figure 7:
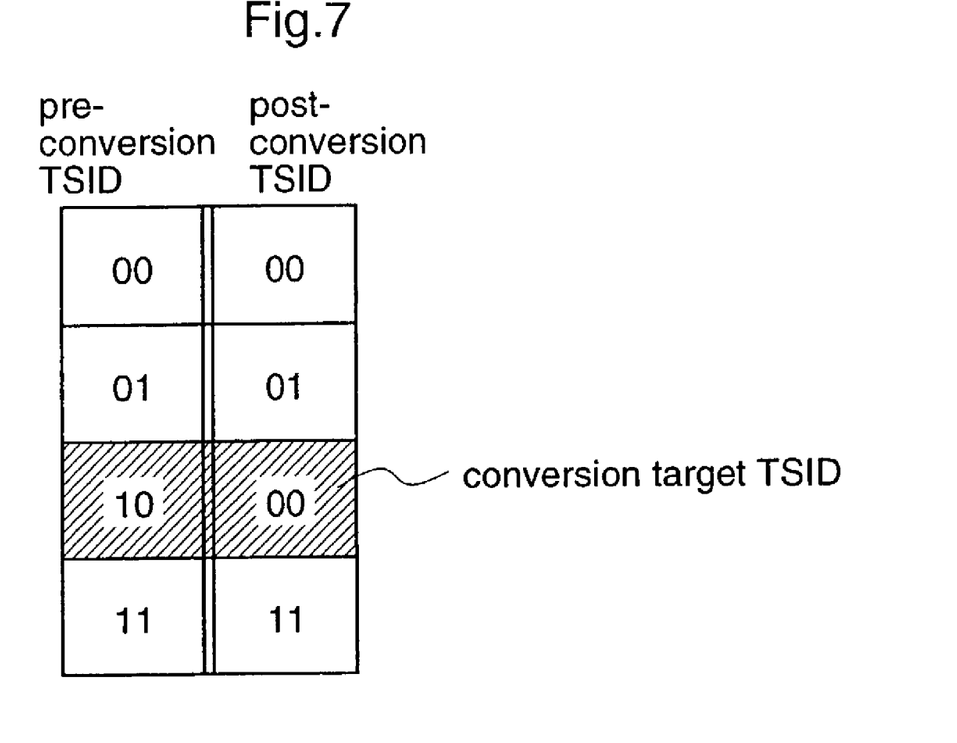
FIG. 7 is a diagram for explaining a TSID conversion table in the demultiplexer circuit according to the third embodiment.

A control circuit 16 issues a command for making a TSID conversion table 17 convert TSID, in accordance with a command 20 from an inside control circuit (not shown). When receiving the command for converting the TSID from the control circuit 16, the TSID conversion table 17 converts the TSID that is added to the input data by the TSID addition circuit 2, in accordance with this command. FIG. 7 is a diagram for explaining conversion data which are stored in the TSID conversion table 17, showing pre-converted TSIDs and post-converted TSIDs corresponding to the first to fourth inputs 1a to 1d, respectively. A diagonally shaded part in this figure is a part in which the pre-converted TSID and the post-converted TSID have different values, i.e., TSID to be converted.

Next, the operation of the demultiplexer circuit according to the third embodiment will be described. The same elements as those in the first embodiment will not be described here.

A TS packet outputted to the output line 9 is inputted to the TSID check circuit 15. The TSID check circuit 15 checks TSID included in this TS packet, and converts an arbitrary area 11 that does not affect the demultiplexing process and has been replaced with the TSID, into a state immediately before it is replaced with the TSID, i.e., into its original bit state, to be outputted to the output line 18. Thereby, the TS packet that is in a state where this packet was inputted to the input lines 1 is outputted to a circuit of the next stage, which is connected via the output line 18, thereby eliminating adverse effects resulting from the TSIDs which are added by the TSID addition circuit 2, upon a processing by the circuit of the next stage.

On the other hand, the control circuit 16 outputs a control signal to the TSID conversion table 17 in accordance with the command 20 that is inputted from an inside control circuit (not shown), to convert data that is added as TSID to the data which are inputted presently through a designated input line, into another TSID that is designated by the inside control circuit.

The inside control circuit may be a circuit which always monitors load conditions of inputted TS packets to transmit a control signal to the control circuit 16 for changing the first to fourth inputs 1a to 1d so as to optimize respective input loads on the input lines 1. Further, this inside control circuit simultaneously transmits timing information for converting the TSID conversion table 17 to the control circuit 16.

The TSID conversion table 17 converts the designated TSID into another designated TSID, in accordance with the control signal from the TSID control circuit 16. For example, FIG. 7 shows an example in which target TSID to be converted '10' is converted into TSID '00'. The TSID addition circuit 2 converts the TSID designated by the TSID conversion table 17 among the TSIDs which are added to the TS packets, into another designated TSID. Then, the circuit 2 replaces arbitrary areas 11 which do not affect the demultiplexing process for the TS packets inputted through the input lines 1 with the TSIDs on the basis of the TSID conversion table 17, and transmits the packets to the multiplexer 4. Hereinafter, the operation of the filter 6 and following operations are the same as those in the first embodiment.

According to the third embodiment of the present invention, the TSID check circuit 15 can restore the TS packet to which the TSID has been added into a state immediately before the TS packets were inputted to the TSID addition circuit 2, i.e., to its original state, thereby completely eliminating adverse influences resulting from the addition of TSIDs upon the circuit of the next stage, which is connected through the output line 18.

In addition, the control circuit 16 processes a control signal (command) 20 which is outputted from an inside control circuit or the like, for monitoring the load conditions of the inputted TS packets, and controls the TSID addition circuit 2 via the TSID conversion table 17 to convert the TSID which is added to the TS packets. Therefore, the input lines can be changed depending on the load conditions of the TS packets, whereby the TS packets can be distributed optimally. Further, by converting the TSIDs, plural pieces of the same kind of input data can be inputted through different input lines.

[Embodiment 4]

A demultiplexer circuit according to a fourth embodiment of the present invention is provided with plural tuners in a previous stage of the TSID addition circuit, and enables to demultiplex data obtained from broadcast radio waves based on different standards.

Figure 8:
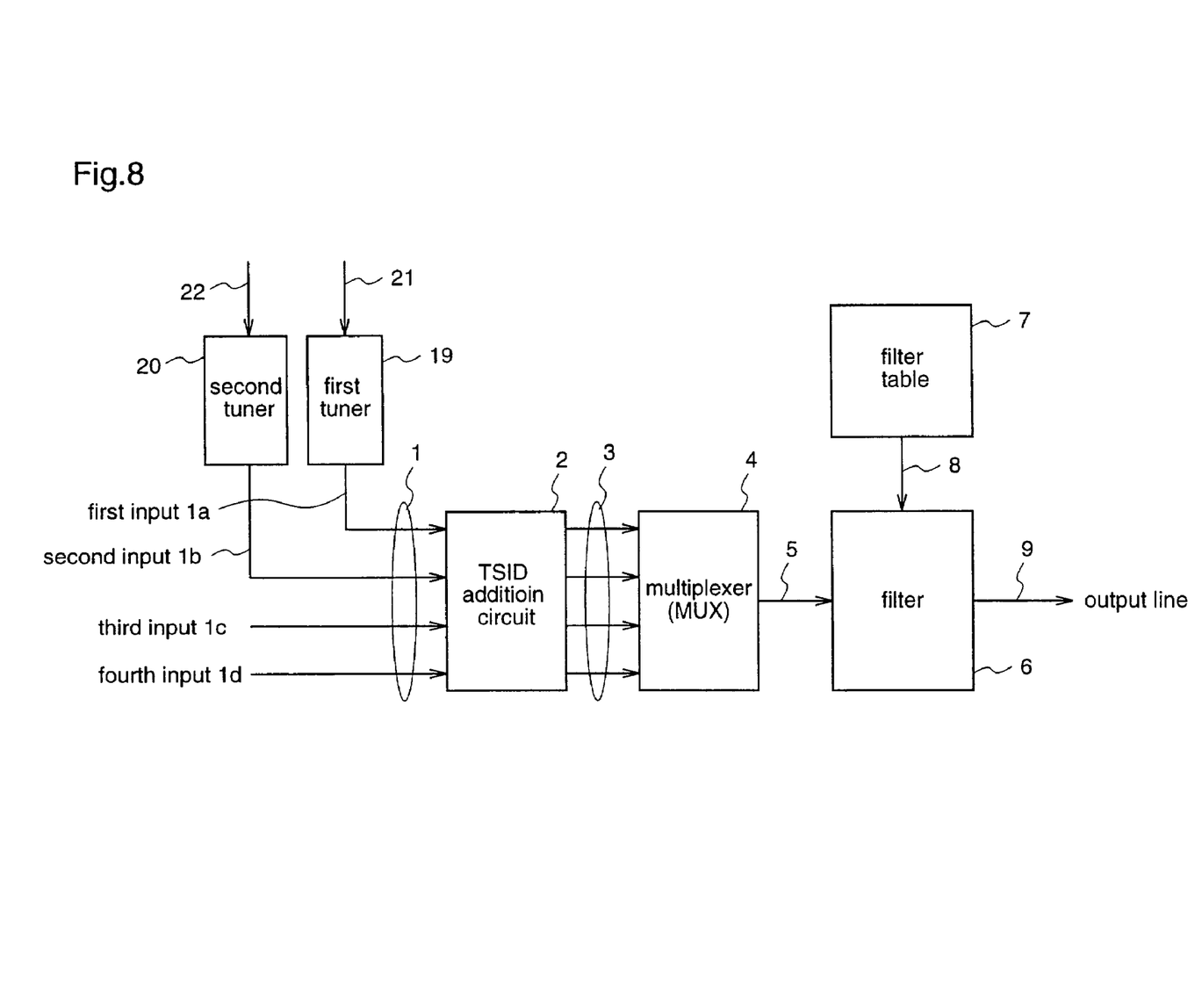
FIG. 8 is a block diagram illustrating a structure of a demultiplexer circuit according to a fourth embodiment of the present invention.

FIG. 8 is a block diagram illustrating a structure of the demultiplexer circuit according to the fourth embodiment. In this figure, the same reference numerals as those in FIG. 1 denote the same or corresponding element. A first tuner 19 and a second tuner 20 carry out a processing for extracting TS packets from broadcast radio waves as high frequency inputs 21 and 22 which are different from each other, respectively.

Next, the operation of the demultiplexer circuit according to the fourth embodiment will be described. The high frequency input 21 that is received by an antenna (not shown) or the like is inputted to the first tuner 19, and TS packets are extracted. The extracted TS packets are inputted to the TSID addition circuit 2 as the first input 1a of the input lines 1. Similarly, the high frequency input 22 is inputted to the second tuner 20, and TS packets are extracted to be inputted to the TSID addition circuit 2 as the second input 1b of the input lines 1. The TSID addition circuit 2 replaces an arbitrary area 11 in each of the TS packets extracted by the first tuner 19 and the second tuner 20, which does not affect the demultiplexing process for the TS packets, with TSID. Following processes are the same as those described in the first embodiment.

In this fourth embodiment, the demultiplexer circuit is provided with two tuners. However, in this invention, tuners may be provided by the number corresponding to the number of inputs to the TSID addition circuit 2 at the maximum, and these tuners may be connected as respective inputs to the input lines 1.

The demultiplexer circuit according to the fourth embodiment is provided with the plural tuners 19 and 20 in the previous stage of the TSID addition circuit 2, and replaces the arbitrary area 11 in each of the TS packets from the tuners 19 and 20, which does not affect the demultiplexing process for the TS packets, with the input line identification information (TSID) 25. Therefore, data obtained from broadcast waves of different standards, depending on the number of the tuners, can be demultiplexed. Accordingly, the prior art requires plural demultiplexer circuits corresponding to the number of kinds of broadcasting, such as BS satellite broadcasting, CS satellite broadcasting, and cable broadcasting, while these data can be processed by one demultiplexer circuit according to the present invention.

What is claimed is:

1. A demultiplexer circuit comprising:
   an input line identification information addition circuit for adding input line identification information to input data which previously have data identification information and are inputted from plural input lines, respectively, to identify the plural input lines;
   a multiplexer for multiplexing the respective input data to which the input line identification information has been added, and outputting multiplexed data through one common line;
   a filter table that contains input line identification information and data identification information which are used as filtering conditions; and a filter for filtering the input line identification information and the data identification information in the multiplexed data which is outputted from the multiplexer on the basis of the filtering conditions contained in the filter table, to extract desired data.

2. The demultiplexer circuit of claim 1 wherein the input line identification information addition circuit replaces an arbitrary area in each of the input data previously having the data identification information, which area does not affect a demultiplexing process, with the input line identification information.

3. The demultiplexer circuit of claim 1 wherein the filter table contains the input line identification information and the data identification information in one table, and the filter filters the input data which is outputted from the multiplexer on the basis of the input line identification information and the data identification information, simultaneously in one processing.

4. The demultiplexer circuit of claim 1 wherein the filter table contains the input line identification information and the data identification information separately in different tables, and the filter filters the input data which is outputted from the multiplexer on the basis of the input line identification information and the data identification information, individually.

5. The demultiplexer circuit of claim 3 wherein the filter table contains another filtering conditions in addition to the input line identification information and the data identification information, in one table, and the filter performs filtering on the basis of the filtering conditions contained in the filter table.

6. The demultiplexer circuit of claim 4 wherein the filter table contains other filtering condition in addition to the input line identification information and the data identification information, separately, and the filter performs filtering on the basis of the filtering conditions contained in the filter table, individually.

7. The demultiplexer circuit of claim 1 including:
an input line identification information check circuit for restoring the area in the data outputted from the filter, which has been replaced with the input line identification information by the input line identification information addition circuit, into its original bit state.

8. The demultiplexer circuit of claim 1 including:
an input line identification information conversion table for converting the input line identification information that is added by the input line identification information addition circuit depending on input lines to which data have been inputted, into desired input line identification information.

9. The demultiplexer circuit of claim 1 wherein plural tuners for extracting data from broadcast radio waves based on different standards, respectively, are included in a previous stage of the input line identification information addition circuit, and the data which are extracted from the broadcast radio waves by the plural tuners are processed.

* * * * *